Patented July 18, 1933

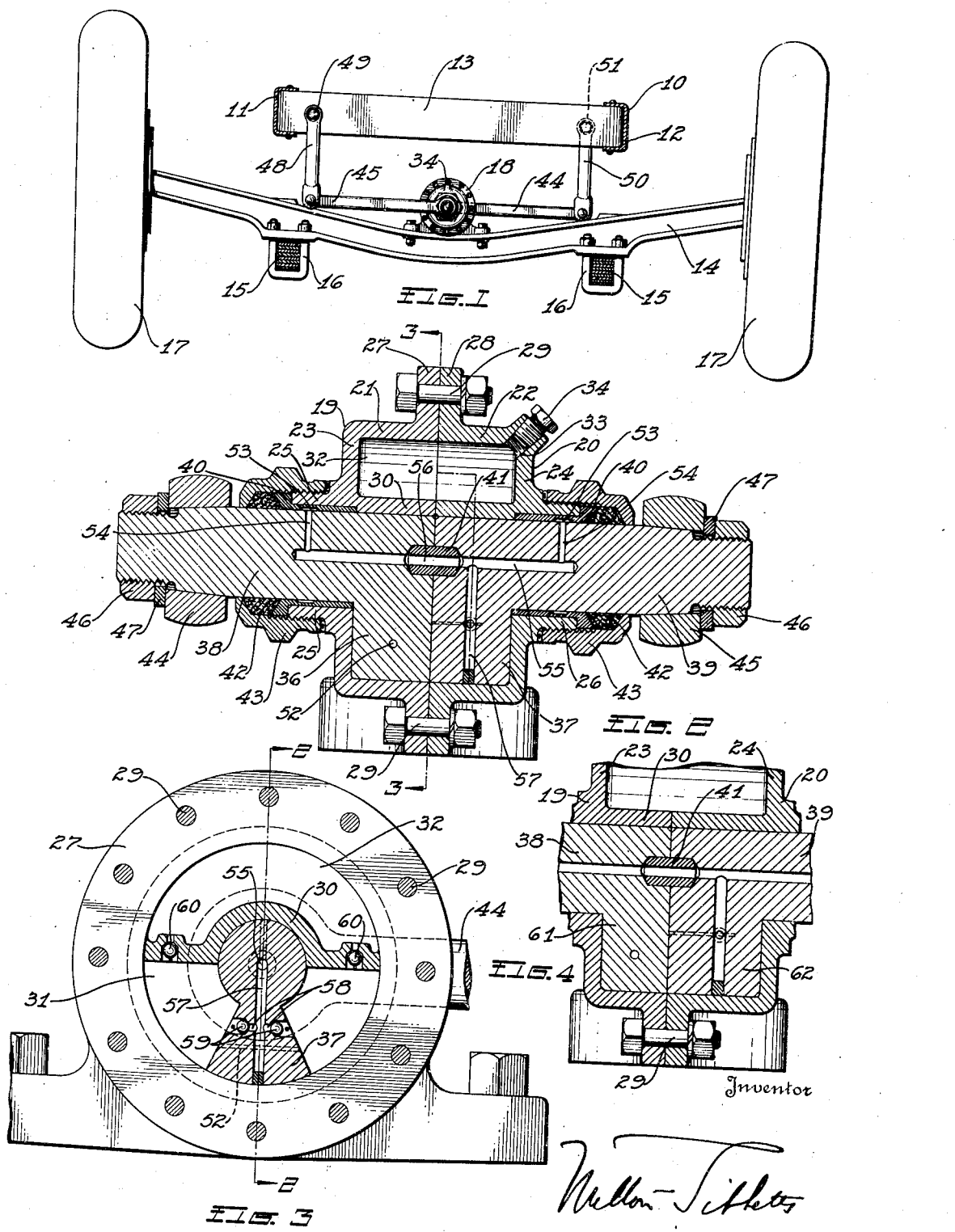

1,918,574

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

SHOCK ABSORBER

Application filed January 5, 1928. Serial No. 244,652.

This invention relates to shock absorbers of the hydraulic type used on such vehicles between the frame and axle for controlling the relative movement thereof to improve the riding qualities of the vehicle.

The use of low pressure tires on motor vehicles is responsible for the relatively rapid or violent vertical reciprocating movement of the front or steering wheels occurring at certain vehicle speeds and over certain types of road surfaces sometimes referred to in the art as "tramping" or "wheel shimmy". This movement of the steering wheels, which is usually accompanied by a lateral vibration thereof, is started or aggravated by unequal spring deflections on opposite sides of the front of the vehicle, such as by one end of the axle moving up or down relative to the vehicle frame more than the other end or by an up and down movement of one end of the axle relative to the frame followed by a similar movement of the other end, causing the front axle to have a substantially oscillatory movement in a vertical plane about its center.

Various devices have been employed for dampening this oscillatory movement or for eliminating it altogether by causing the axle to move only in parallel relation with respect to the frame. One of such devices employs a hydraulic shock absorber mounted at each end of the front axle and operatively connected to the frame, the shock absorbers being so interconnected by pipe lines adapted to convey liquid from one shock absorber to the other that the oscillatory movement of the front axle is damped or entirely eliminated. It is one of the objects of the present invention to simplify the hydraulic shock absorbing means referred to and to provide an improved means for controlling the movement of the front axle of a motor vehicle to eliminate wheel "tramping" or "shimmy".

Another object of the present invention is to provide shock absorbing or axle control means adapted to cause the front axle of a motor vehicle to move only in parallel relation with the frame of the vehicle and thus eliminate "tramping" or "wheel shimmy".

Another object of the invention is to prevent oscillatory movement of the front axle of a motor vehicle in a vertical plane about its center by improved and simplified shock absorbing or axle control means.

Another object of the invention is to eliminate wheel "tramping" or "shimmy" by shock absorbing or axle control means centrally located with respect to the front axle of a motor vehicle.

Other objects of the invention will appear from the following description taken in connection with the drawing forming a part of this specification, in which:

Fig. 1 is a view in elevation, with parts in section, showing the front end of a motor vehicle embodying the invention;

Fig. 2 is an enlarged sectional view of the shock absorber taken substantially on line 2—2 of Fig. 3;

Fig. 3 is a sectional view of the shock absorber substantially on line 3—3 of Fig. 2, and Fig. 4 is a fragmentary sectional view of a modified form of shock absorber.

Referring to the drawing, 10 represents generally the frame of a motor vehicle, the side members 11 and 12 of which are connected by a cross member 13. One of the axles of the vehicle is shown at 14 and in the embodiment selected for illustration, the front or steering axle is shown. The frame is supported on the axle through underslung springs 15 connected to the axle by U-bolts 16. At the ends of the axle 14 are the usual steering knuckles (not shown) by which the vehicle is steered and upon which are pivotally mounted the wheels 17.

The shock absorbing or axle control means in the preferred form shown in Fig. 2 comprises a hydraulic unit 18 suitably mounted on the axle 14 and operatively connected to the frame 10 of the vehicle in a manner presently to be described. The casing of the hydraulic unit is preferably formed from two sections 19 and 20 each having respectively a cylindrical portion 21 and 22, an end wall 23 and 24 and a bearing portion 25 and 26. Each of the cylindrical portions 21 and 22 are provided with an annular flange 27 and 28 secured together in any suitable manner as by a plurality of bolts 29. Extending outwardly from the interior of each of the end walls 23 and 24 is a flange, forming when the two sections of the casing are secured together, a partition 30 which divides the interior of the casing into two chambers, a working chamber 31 and a replenishing chamber or reservoir 32. The working chamber and replenishing reservoir are substantially filled by any suitable liquid such as oil or glycerine introduced through an opening 33 in the casing, the opening being closed by a plug 34.

A pair of pistons 36 and 37 mounted to oscillate in the working chamber 31 are carried by separate shafts 38 and 39 suitably supported in the casing in bearing sleeves 40 mounted in bearing portions 25 and 26. At their inner abutting ends, both shafts are drilled to provide a bore adapted to receive a dowel 41 which aids in maintaining shafts 38 and 39 in alignment. A packing 42 is compressed against each of bearing sleeves 40 by a hollow nut 43, screwed on each of the bearing portions 25 and 26 of the casing. Outwardly from the hollow nuts 43 each of the shafts 38 and 39 is serrated and arms 44 and 45 are mounted on the serrated portion of shaft 38 and 39 respectively and are held thereon by nuts 46 and lock washers 47. With the hydraulic unit 18 mounted on the axle as shown, arms 44 and 45 are connected in any suitable manner to the vehicle frame at spaced points, arm 45 being connected by means of a link 48 pivoted at 49 to cross member 13 adjacent side member 11 and arm 44 being connected through a link 50 pivoted at 51 to the cross member adjacent side frame member 12. Thus since arms 44 and 45 are connected to a part that moves relatively to the part upon which the hydraulic unit 18 is mounted, it is apparent that pistons 36 and 37 will be operated in working chamber 31 as the vehicle parts move relatively to each other.

Provision is made for by-passing some of the liquid in the working chamber upon movement of either or both of the pistons therein and in the shock absorbing or axle control means shown this by-pass comprises an aperture 52 drilled in piston 36. It is unnecessary to provide a by-pass in both pistons because both operate in the same working chamber and a single by-pass in either piston will suffice.

In order to prevent the leakage of liquid from the casing of the hydraulic unit around shafts 38 or 39 and to return to the working chamber any leakage liquid before it reaches packings 42, bearing sleeves 40 are each provided with an annular leakage groove 53 in which any liquid escaping from the working chamber in the direction of the packings will be caught. Connecting with each of leakage grooves 53 is a radial passage 54 in each of shafts 38 and 39 which communicate with an axial passage 55 in the shafts. To provide a clear passage between the radial passages 54, dowel 41 is centrally bored as shown at 56. A passage 57 in piston 37 connects with passage 55 and the two short opposed passages 58 connect with passage 57 and have a pair of ball check valves 59 arranged therein. Any liquid escaping from working chamber 31 and caught in either of the leakage grooves will be drawn back into the working chamber through passages 54, 55, 57 and 58 and through ball check valves 59 by reason of the suction existing in the working chamber on the low pressure or retreating side of piston 37. It will be understood that the ball check valves 59 and related passages may be associated with either one of the pistons, but it is unnecessary that both pistons be so provided. The liquid in the working chamber may be replenished when necessary by liquid from the replenishing chamber or reservoir 32 through check valves 60 in partition 30. Valves 60 are normally open, that is, they are open when both pistons are at rest, so that replenishing liquid will flow by gravity into the working chamber.

With such shock absorbing or axle control means mounted in relation to the vehicle frame and axle as described, any tendency of the axle to oscillate in a vertical plane about its center will be damped out, while movement of the axle relative to the frame in parallel relation thereto will practically not be resisted. For example, and to take the case of the relative movement of the frame and axle in parallel relation first, if both ends of the axle move up or down at the same time in the same direction, pistons 36 and 37 will move equally in opposite directions in the working chamber and there will be no resultant change in the capacity of the portions of the working chamber lying on either side of the pistons. In other words, for relative parallel movement of the frame and axle, the pistons will be moved equally in opposite directions and the extent to which the capacity of the working chamber is diminished on one side of one piston will exactly equal the extent of increase of the capacity on the same side of the other piston. Some of the liquid will thus merely move from one side of one piston to the same side of the other piston and there will be accordingly no resistance to such equal and opposite movement of the pistons and no resistance to relative movement of the frame and axle in parallel relation.

However, should one end of the frame or axle tend to move relative to the other while the other end remains substantially motionless, one of the pistons will move in a direction depending on the direction of tendency of relative movement of the frame and axle while the other piston will not move at all. Hence there will be a tendency to diminish the capacity of the working chamber on one side or the other of the pistons and such tendency will be resisted by the liquid in the working chamber. The effect and result is the same, only more marked, if one end of the axle or frame tends to move oppositely to the other, or in other words, if the axle or frame tend to oscillate relative to each other. And this is likewise true if one end of the frame or axle tends to move relative to the other more than the other end. Any such movement will be resisted and the greater the suddenness of such movement the greater will be the resistance thereto because of the time required for the liquid to flow through small by-pass 52 in piston 36.

The structure constituting the preferred form of the present invention disclosed in Fig. 2 does not function as a shock absorber in the sense in which the term is generally understood in the art, but functions only to eliminate or dampen wheel "tramping" or "shimmy". However, if shock absorbing action is desired together with the wheel "tramping" or "shimmy" eliminating or dampening action, only a slight change need be made in the structure disclosed in Fig. 2 to obtain this result. This change is embodied in Fig. 4.

The modified form disclosed in Fig. 4 differs only from the preferred form in that the two pistons 61 and 62 are made of unequal width to provide a shock absorbing action. The cylindrical portions of the casing sections are preferably of a width commensurate with the width of the pistons as shown. The action resulting from movement of the pistons of unequal width will readily be apparent. Equal movement of the pistons in opposite directions will cause a change in the capacity of the working chamber on either side of the pistons and consequently there will be some resistance to relative movement of the frame and axle in parallel relation. Any other relative movement of the two pistons resulting from any relative movement of the frame and axle will of course be resisted just as it would be if the pistons were of equal width.

It will be understood that various forms of the invention other than those described above may be used without departing from the spirit or scope of the invention.

Having thus described my invention, what I claim and desire to secure by Letters Patent is:

1. In a shock absorber, a casing and a plurality of pistons independently rotatable in parallel planes and in different directions in the casing.

2. In a shock absorber, a casing and a plurality of rotatable pistons independently operable adapted to move in parallel planes to each other in the casing.

3. In a shock absorber, a casing and a plurality of independent pistons normally in alignment in the casing and adapted to rotate in parallel planes to each other.

4. In a shock absorber, a casing and a pair of rotatable independent pistons movable relatively to and in parallel planes with respect to each other in the casing.

5. In a shock absorber, a casing, oppositely disposed shafts associated with the casing and a piston carried by each of the shafts and operable in the casing, said pistons being relatively movable in different planes.

6. In a shock absorber, a casing and a pair of pistons in the casing relatively movable in different planes in the same or opposite directions.

7. In a motor vehicle, in combination, frame and axle members, a shock absorber mounted on one of said members and operatively connected to the other of said members, said shock absorber comprising a casing and a plurality of independent pistons rotatable in parallel planes with respect to each other in the casing.

8. In a motor vehicle, in combination, frame and axle members, a shock absorber mounted on one of said members and operatively connected at spaced points to the other of said members, said shock absorber comprising a casing and a pair of independent pistons movable in parallel planes within the casing.

9. In a motor vehicle, in combination, frame and axle members, a shock absorber having a casing mounted on one of said members, a pair of pistons operable in the casing and connected at spaced points to the other of said members, said pistons being relatively movable in different planes.

10. In a motor vehicle, in combination, a frame, a front axle, a shock absorber mounted on the front axle, a casing for the shock absorber, oppositely disposed shafts associated with the casing, pistons movable relatively in different planes in the casing and carried by the shafts and means connecting each piston through its shaft to spaced points of the frame.

11. In a shock absorber, a casing, a working chamber in the casing, a pair of pistons movable in different planes in the working chamber, said pistons being independently operable, a replenishing chamber arranged above the working chamber, a partition separating the working and replenishing chambers and a normally open valve carried by the partition through which replenishing liquid may enter the working chamber.

12. In a motor vehicle having a front axle and a frame, a hydraulic shock absorber mounted substantially centrally of the front axle, oppositely disposed shafts for the shock absorber, a piston carried by each of the shafts, and spaced means connecting the vehicle frame and the oppositely disposed shafts, whereby relative movement of the frame and axle in parallel relation is not resisted, but other relative movement of the frame and axle is resisted.

13. In a shock absorber, a casing and a pair of rotatable independent pistons of equal dimensions operable in different planes in the casing.

14. In a shock absorber, a casing and a pair of rotatable independent pistons operable in different planes within the casing.

15. In a motor vehicle, in combination, frame and axle members, a shock absorber positioned on one of the members and independent piston means in the absorber operatively connected at spaced points to the other member and relatively movable in different planes.

16. In a motor vehicle, in combination, frame and axle members, a shock absorbing unit positioned on one of the members including independently rotatable pistons, operating arms for the unit extending in opposite directions and separate means connecting the respective arms to the other member.

17. In a shock absorber, in combination, frame and axle members, a casing positioned on one of said members, a working chamber in the casing, a plurality of pistons movable in different planes in the working chamber and means for operatively connecting the pistons to the other member at spaced points.

18. In a shock absorber, in combination, frame and axle members, a casing positioned on one of said members, a working chamber in the casing, a pair of pistons movable in different planes in the working chamber, one of said pistons having a by-pass and means for operatively connecting the pistons to the other member at spaced points.

19. In a shock absorber, in combination, frame and axle members, a casing positioned on one of the members, a working chamber in the casing, a plurality of pistons movable in different planes within the working chamber, means associated with the pistons for retrieving and returning escaping liquid to the working chamber, and means for operatively connecting the pistons to the other member.

20. In a motor vehicle, in combination, frame and axle members, a shock absorbing unit positioned on one of the members including independently rotatable pistons, and means operatively connecting the pistons to the other member at spaced points.

21. In a motor vehicle, the combination with the frame and axle means, of hydraulic shock absorber means connected to the frame and axle means to resist relative movement therebetween, said hydraulic shock absorber means being so constructed and so connected to the frame and axle means as to offer resistance to relative movement of the frame and axle means in parallel relation and greater resistance to the relative movement of the frame and axle means in non-parallel relation.

22. In a motor vehicle, the combination with the frame and axle means, of hydraulic shock absorber means mounted in a single casing and connected to the frame and axle means to resist relative movement therebetween, said hydraulic shock absorber means being so constructed and so connected to the frame and axle means as to offer resistance to relative movement of the frame and axle means in parallel relation and greater resistance to the relative movement of the frame and axle means in non-parallel relation.

23. In a motor vehicle, in combination, a frame, axle means, a shock absorbing unit positioned on one of said elements, two independently movable piston means mounted side by side in said unit, arms connected to operate said pistons respectively, and connections from said arms to spaced points on the other of said elements.

24. In a motor vehicle, in combination, a frame, axle means, a shock absorbing unit positioned on one of said elements adjacent the center axis of the vehicle, two independently movable pistons in said unit, shafts supported adjacent each other in said unit and carrying said pistons respectively, arms mounted on said shafts and extending in opposite directions, and separate means connecting the respective arms to spaced points on the other of said elements.

MILTON TIBBETTS.